United States Patent [19]

Bouche

[11] 4,011,397
[45] Mar. 8, 1977

[54] VIBRATION DAMPER FOR HIGH VOLTAGE CABLES

[76] Inventor: Raymond R. Bouche, 9419 Cordero Ave., Tujunga, Calif. 91402

[22] Filed: Aug. 11, 1975

[21] Appl. No.: 603,622

Related U.S. Application Data

[63] Continuation-in-part of Ser. No. 454,421, March 25, 1974, abandoned.

[52] U.S. Cl. .............................. 174/42; 24/262 R; 248/74 R; 267/33; 267/167; 267/179
[51] Int. Cl.² ........................................... H02G 7/14
[58] Field of Search ............ 174/42, 40 CC, 138 H, 174/160; 188/1 B, 266; 248/358 R, 50, 54 R, 58, 60, 74 R, 358 AA; 267/136, 33, 167, 179; 24/262 R; 152/285; 200/276

[56] References Cited

UNITED STATES PATENTS

| | | | |
|---|---|---|---|
| 1,060,823 | 5/1913 | Cruise | 152/285 X |
| 1,936,389 | 11/1933 | Hallquist | 267/33 X |
| 2,352,318 | 6/1944 | Guarnaschelli | 248/54 R |
| 2,494,353 | 1/1950 | Rostoker | 174/42 |
| 2,615,077 | 10/1952 | Tinker | 200/276 X |
| 2,694,101 | 11/1954 | Shuhart | 174/42 |
| 3,260,789 | 7/1966 | Edwards | 174/42 |
| 3,432,610 | 3/1969 | Claren | 174/42 |
| 3,446,907 | 5/1969 | Bouche | 174/42 |
| 3,597,522 | 8/1971 | Kobayashi | 174/42 |
| 3,644,660 | 2/1972 | Dulhunty | 174/42 |

FOREIGN PATENTS OR APPLICATIONS

| | | | |
|---|---|---|---|
| 684,540 | 3/1930 | France | 174/42 |
| 559,645 | 9/1932 | Germany | 174/42 |
| 907,429 | 3/1954 | Germany | 174/42 |
| 794,571 | 5/1958 | United Kingdom | 248/74 R |

*Primary Examiner*—Laramie E. Askin
*Attorney, Agent, or Firm*—Reed C. Lawlor

[57] ABSTRACT

Improved multiple mode dampers for damping Aeolian vibrations of electrical cables are provided which employ a single mass and two resilient support members that are respectively connected between separate points of the mass and separate points of the cable. The modes of vibration of the damper are made interdependent by utilizing springs having different moments of stiffness with respect to the center of gravity of the mass. The mass is made of concrete. The improvement comprises the use of springs which are independently connected to the cable at different points permitting the spreading of the springs which can be accomplished economically and yet permit an increase of the rotational torque exerted on the damper by the cable. This facilitates concentration of damper vibration resonance frequencies at critical wind speeds which would ordinarily induce great dynamic mechanical stress in electrical cables.

41 Claims, 18 Drawing Figures

VIBRATION DAMPER FOR HIGH VOLTAGE CABLES

CROSS REFERENCES TO RELATED APPLICATIONS

This is a continuation-in-part of application Ser. No. 454,421, filed Mar. 25, 1974, by Raymond R. Bouche, now abandoned.

BACKGROUND OF THE INVENTION

This invention relates in general to vibration damping devices and, in particular, to an improved vibration damper for suspended electrical transmission cables and the like. In a typical suspended cable, Aeolian vibrations are induced in each span as a result of the wind flowing past it. The vibration is caused by vortices which are formed on the leeward side of the cable. These vortices alternate in direction, setting up alternating vertical forces which, in turn, cause the cable to vibrate, largely in a vertical plane. The frequency at which the directions of those vortices alternate is proportional to the wind velocity and inversely proportional to the diameter of the cable. As the wind speed increases, the frequency of alternation of the vortices increases, thereby causing the frequency of the resultant vibrations to increase likewise. The frequency of alternation of these vertical forces applied to the cable is the same as one of the resonance frequencies of that particular span and therefore the cable resonates. A particular span of cable, which is a continuous electrical conductor, suspended between two points, has a large number of resonance frequencies. The resonance frequencies of a particular cable span depend upon the weight per unit length of the cable, the span length, and the tension in the cable. They also depend upon the gravitional constant. The vibration pattern of the line takes the form of a sinusoidal deflection curve with the vibration originating in the span and traveling back and forth along the length of the span. Nodes are established at the ends of the span and, usually, both loops and nodes between the ends.

As the cable vibrates, it flexes at the points at which it is clamped and also undergoes significantly large values of dynamic mechanical stress. Such repeated flexing and great stress lead to fatigue failure in the cable and damage to suspension hardware. This vibration is substantially reduced at both ends of a span as well as elsewhere in the span by means of a damper employing this invention installed at only one end of the span.

PRIOR ART

It is well known in the art to use multiple mode dampers having two or more resonance frequencies to effectively protect the cable from vibrations throughout a wide range of wind speeds.

Multiple degree of freedom dampers were disclosed by Stockbridge in 1928 in U.S. Pat. No. 1,675,391. Dampers similar to the Stockbridge damper were disclosed by Monroe et al in 1935 in U.S. Pat. No. 1,992,538; by MacIntyre in 1954 in U.S. Pat. No. 2,688,047; and by Clark et al in 1962 in U.S. Pat. No. 3,052,747. In each of these dampers, identical masses are attached to ends of springs. The point of attachment is near the center of gravity of the masses. The two resonance frequencies in a vertical plane are achieved because the masses may vibrate naturally about two points, one at the support end of each spring and one near the mass attachment point on the spring.

A multiple degree of freedom damper having two or more resonance frequencies in a vertical plane obtained with the use of a single mass and two or more resilient members was disclosed by Bouche in 1969 in U.S. Pat. No. 3,446,907. This damper achieved its resonance frequencies by having non-symmetrical resilient members, the nonsymmetry residing in the stiffness of the resilient members or their placement with respect to the center of gravity of the mass or combinations of both.

SUMMARY OF THE INVENTION

This invention incorporates the advantages of Bouche's invention set forth in U.S. Pat. No. 3,446,907. These include low resonance frequencies effective for damping larger cables; relatively stiff resilient members which provide effective damping while having low fatigue rates; and a mass having neither special shape nor being of very high density so that it is of so simple a design that it may be made from an inexpensive material, such as concrete. However, this invention has additional advantages. These include a concentration of resonance frequencies in the range of critical wind speeds; a more efficient coupling arrangement; and effectiveness sufficiently improved to obviate the need for dampers at both ends of a cable span.

The impetus to develop multiple degree of freedom dampers is obvious when one considers that single-degree-of-freedom dampers are most effective only for cable resonance frequencies in the range of a single resonance frequency of the damper. By having more than one resonance frequency, the multiple degree of freedom dampers permit a significant decrease in the number of dampers used to attenuate Aeolian vibrations in a cable throughout a wide range of wind speeds. It is very desirable to provide the required attenuation of vibrations of high tension cables, which have large diameters, over a wide range of wind speeds while using only a single damper for an entire span. To accomplish this result it is necessary to concentrate the resonances of the damper in a narrow range of critical wind speeds primarily responsible for the fatigue and ultimate failure of the suspended cables.

In the present invention, the concentration of lower resonant frequencies is achieved by increasing the separation between resilient members, by providing two points of attachment to the cable and to the inertial member, and by providing a longer inertial member. Additional means for further improving the damping performance of the prior art dampers will be made evident upon reading the detailed description of the invention herein.

One object of this invention is to provide an improved damper that is characterized by an increased torque moment, thereby increasing the damping.

Another object of this invention is to provide a damper capable of damping the vibrations of heavy cables subjected to wind speeds which would otherwise cause such heavy cables to fatigue and fail rapidly.

A further object of this invention is to provide a damper, such that only one need be used at one end of a span for damping critical resonance frequencies at both ends of a span of a heavy cable which is excited by low wind speeds.

Still another object of this invention is to provide a damper having a simple design, and which can be manufactured from low cost materials, which has few parts and which is simple to install.

Still another object of this invention is to provide a damper having components which may be easily removed and replaced, making it unnecessary to replace the entire damper for purposes of repair.

The foregoing and other objects and advantages of the invention will be more fully appreciated from the detailed description and accompanying drawings.

DESCRIPTION

First Embodiment

Figures 1, 2:
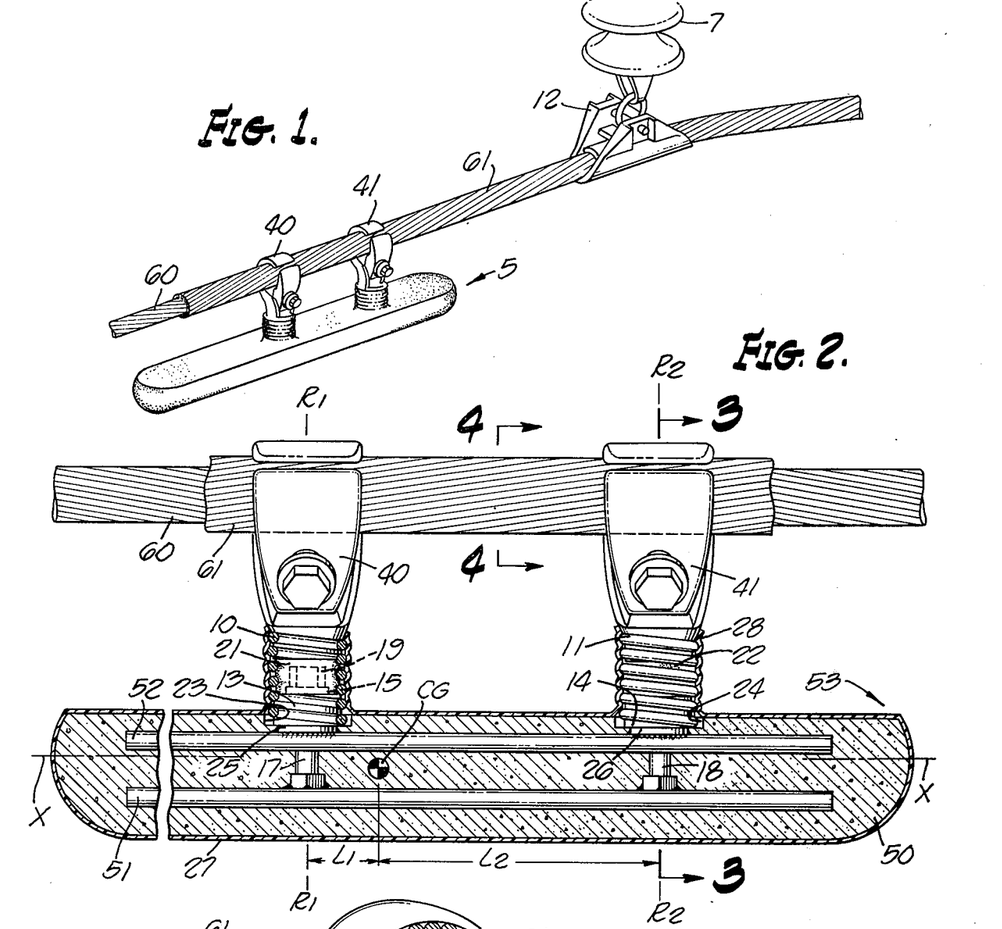
FIG. 1 is a perspective view of one embodiment of this invention installed on an overhead transmission line.
FIG. 2 is a partially cut away front elevational view of one embodiment of this invention.

Referring to FIG. 1 there is illustrated a vibration damper 5 embodying the invention and mounted on a span of electrical cable 60 at a point spaced from an insulator 7 and shoe 12 from which the cable is suspended. Armor rod 61 covers the cable 60 at and near the point of suspension. The vibration damper includes two clamps 40 and 41 by which the damper is rigidly attached to the cable 60 and free vibratory inertial member 50 suspended therefrom by means of two springs 10 and 11. Each clamp and spring assembly constitutes a resilient support member.

The vibration damper of FIG. 1 possesses two interdependent modes of vibration characterized by two different resonance frequencies. In the embodiment of the invention illustrated, this interdependence is achieved in part by employing two springs 10 and 11, connected between the inertial member 50 and clamps 40 and 41 respectively, having the same stiffness but arranged asymmetrically with respect to the center of gravity CG of the inertial member and in part by selecting the various parts to have characteristics such that the dynamic mass of the damper 5, as viewed from the clamp, is high compared with the dynamic mass of the cable 60 at the resonance frequencies of the cable over a range of critical wind velocities. The critical wind velocities are those in the range of less than about 5 miles per hour up to about 15 miles per hour. The vibrations at the lower winds in this range create highest alternating stresses in suspended cables and may result in rapid cable fatigue and failure. Vibrations in this wind speed range may also cause damage to suspension hardware.

The damper 5 is illustrated in greater detail in FIG. 2. In this embodiment of the invention the inertial member 50, as shown in FIG. 2, is an elongated member having a predominantly cylindrical body with spherical, or rounded, ends. Only the surface facing cable 60 is flat, thus providing rounded edges on all surfaces facing away from cable 60, that is, those surfaces of the inertial member that are contrapositioned relative to the cable. This is an important feature in order to achieve superior corona extinction characteristics on high voltage cables. The longitudinal axis of the inertial member X—X is that axis about which the moment of inertia of the inertial member is a minimum.

For convenience, the end of inertial member 50 to which the midpoint between equally resilient springs 10 and 11 is closer is called the spring end 53. Likewise, the other end is called the mass end, or weight end.

Typically, the distance between springs 10 and 11 is greater than the length of either spring and is also greater than the distance between the flat surface of inertial member 50 and cable 60.

Figures 3, 4:
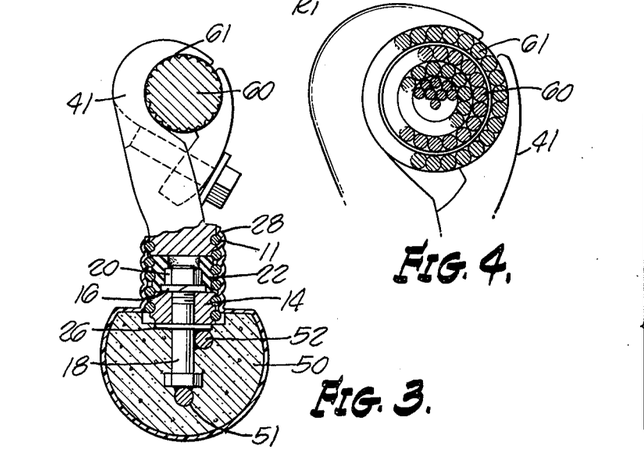
FIG. 3 is a cross-sectional view taken along the line 3—3 of FIG. 2.
FIG. 4 is a cross-sectional view of the cable at one point of connection taken along the line 4—4 of FIG. 2.

Reinforcing rods 51 and 52 extend through the inertial member 50 as shown in FIG. 2 and FIG. 3. These reinforcing rods extend along the direction of the longitudinal axis X—X of the inertial member 50.

Due to the relatively simple design of the inertial member 50, it may be formed inexpensively from a non-metallic material, such as concrete. The placement of the lower reinforcing rod 51 is not critical. However, upper reinforcing rod 52 is placed within the range of about one-quarter inch to about one-half inch from the flat upper surface of the inertial member to help preclude cracking during manufacture. The cement used to form inertial member 50 possesses hardening characteristics which increase as a function of time after manufacture. Thus, the likelihood of a crack occurring in the inertial member is reduced as a function of time.

Figure 5:
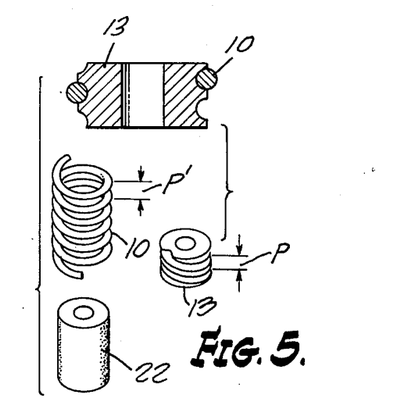
FIG. 5 is an illustration of the spring and holder of FIGS. 1, 2, and 3, shown disassembled.

As indicated in FIGS. 2 and 3, springs 10 and 11 and holders 13 and 14 are left-handed. The wire forming the springs is of circular cross-section and the helix of the spring is left-handed. The holders, or anchors, 13 and 14, shown in FIG. 5, are tubular members designed to be threaded into the lower ends of helical springs. The diameter of the exterior circumference of the holder is slightly greater than the inner diameter of the spring into which is is threaded. A left-handed helical groove of V-shape is formed in the exterior circumference of the holder with a pitch P which may be slightly different from the pitch P' of the spring, or the anchor, to which it attaches. In a practical embodiment of the invention, the anchor pitch P was 0.35 inch and the spring pitch P' was 0.37 inch. The resulting locking mechanism results from good frictional force of the spring on the anchors. This friction assures a secure connection even when the threaded grooves of the anchors have dimensions that are slightly less than the inside spring dimensions. This type of anchor, or holder, serves to prevent stress concentrations in the springs and to prolong spring life.

The two threaded anchor bolts 17 and 18 are cast into the inertial member 50 with each anchor bolt positioned along the length of the inertial member 50 at the selected location for attachment of the springs 10 and 11. The ends of each anchor bolt protrude from the upper surface of the inertial member as shown in FIG. 3, and it is to these ends that the springs 10 and 11 are attached by means of holders, or anchors, 13 and 14, lock washers 15 and 16, and nuts 19 and 20 respectively, as shown in FIGS. 2 and 3. Holders 13 and 14 sit partially within holes 23 and 24 in inertial member 50 where they are seated on washers 25 and 26, respectively.

Rubber tubular members 21 and 22 lie within interior portions of the springs 10 and 11 respectively, above the nuts 19 and 20 respectively. These rubber tubular members add mechanical loss to the damping function, thus smoothing out the damping characteristics. A suitable rubber for this purpose is neoprene rubber, such as closed cell neoprene rubber Type R-180-V manufactured by Rubatex Corporation. In any event, it is best to use a material, such as neoprene, which has a temperature range of about −30° F. to +150° F. and which possesses an average density of about 10 pounds per cubic foot.

Instead of employing rubber to introduce a resistance component in the damping, other means may be employed for introducing such a component. Thus, for example, Coulomb friction may be employed for this purpose by utilizing mechanical elements which slide upon each other. Likewise, dash pot arrangements may be employed for this purpose. However, viscous rubber-like members of the type described are particularly suitable since they are easy to install and retain their properties for many years.

The springs 10 and 11 are connected to clamps 40 and 41 respectively which are threaded to receive and secure the springs. As shown in FIGS. 1 and 2, each clamp is separately connected to the cable 60 thus providing two individual and independent rigid connections of the damper to the cable. As shown in FIG. 3, and encapsulation, or coating, 28 covers the springs 10 and 11, the rubber cylinders 21 and 22, and the holders 13 and 14. The coating 28 serves to prevent corrosion and to resist fatigue failure of the springs. The coating to some small extent also provides an additional resilience factor in the damper. A suitable covering material for this purpose is silicone rubber or butyl rubber. In any event, the most suitable material to use for this process is a material having rubber-like characteristics with a durometer hardness between about 40 and about 70, such as Dow Corning Type 1890 silicone rubber.

As shown in FIG. 3, a covering 27 has been applied to the inertial member 50. A suitable covering is neoprene rubber, such as DuPont Hypalon. Such a covering improves the appearance of the damper and serves to resist weather and ozone corrosion.

Suitable materials for the clamps 40 and 41 are cast aluminum alloy, cast iron, and cast magnesium alloy. Stainless steel, music wire or other suitable spring steel material may be used for the springs 10 and 11.

In FIG. 2, the axis R1—R1 of the spring 10 and the axis R2—R2 of spring 11, are vertical and substantially parallel to each other and are also substantially perpendicular to the longitudinal axis X—X of the inertial member 50. The axis R1—R1 of spring 10 and the axis R2—R2 of spring 11 are substantially coplanar with the longitudinal axis X—X of the inertial member 50 and the longitudinal axis of the cable 60. It is also seen from FIG. 3 that the axes R1—R1 and R2—R2 lie in a plane which passes through the center of the inertial member 50.

As shown in FIG. 2, the distance L1 from the center of gravity CG of the inertial member 50 to the axis R1—R1 is substantially different from the distance L2 from the center of gravity CG of the inertial member 50 to the axis R2—R2. The distances L1 and L2 represent the distances between the center of gravity CG of the inertial member 50 and the axes R1—R1 and R2—R2 respectively.

As shown in FIG. 2, the effect of the springs 10 and 11 is non-symmetrical with respect to a plane perpendicular to the longitudinal axis X—X of the inertial member 50 and passing through the center of gravity CG of the inertial member. This non-symmetrical effect of the springs 10 and 11 accounts for the two resonance frequencies of this embodiment of the invention. The critical factor is neither the placement itself of the springs nor the relative stiffness itself of the springs. The critical factor is moment of stiffness, that is, the product of coefficient of stiffness of each spring and the distance of the spring from the center of gravity of the inertial member. When the moments of stiffness of the two springs are unequal, there are two interdependent modes of vibration in the vertical plane parallel to the longitudinal axis of the inertial member and passing through its center of gravity. But when the moments of stiffness of springs are equal, there will be two independent modes of vibration in the same plane.

Independence of vibration means that vibration may be experienced in one mode without vibration occurring in the other mode. For example, when the moments of stiffness for the springs in FIG. 2 are equal, the inertial member may rotate about its center of gravity without any displacement in the vertical direction of the center of gravity. Similarly, the inertial member may vibrate along a vertical axis passing through the center of gravity with no attendant rotation of the inertial member.

Dependence of vibration or interaction of two modes of vibration means that when the inertial member vibrates in one given mode, vibration in a second given mode will also necessarily occur. In the case where the moments of stiffness for the two springs are unequal, there will be dependence of interaction of two modes of vibration of the damper in a vertical plane parallel to the longitudinal axis of the inertial member passing through its center of gravity. In both modes of vibration there is a translational movement of the center of gravity along a vertical axis, and also a rotational movement of the inertial member about its own center of gravity.

Figures 9, 10A, 10B:
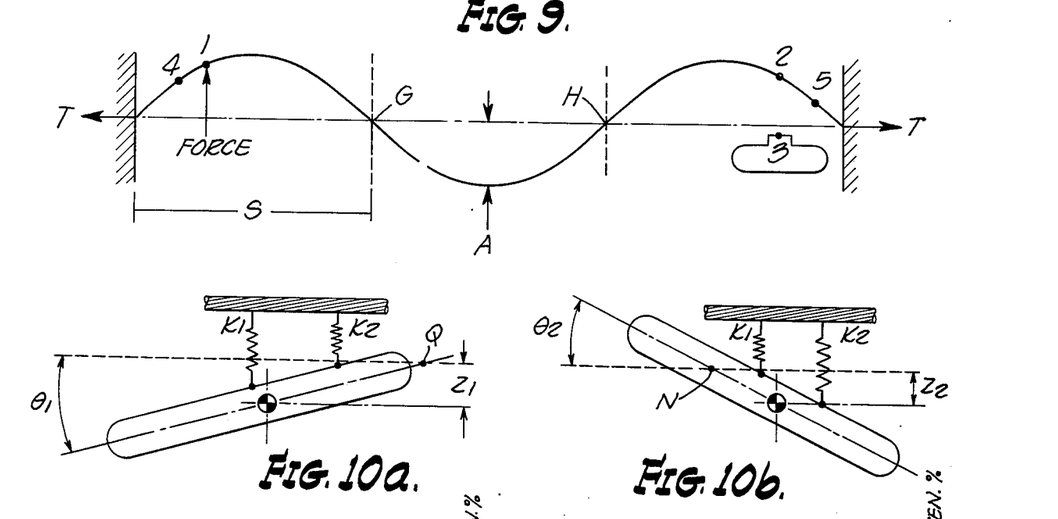
FIG. 9 is a schematic representation used to aid in describing certain aspects of this invention.
FIGS. 10a and 10b are schematic representations used in describing a theory which is related to this invention.

The two modes of dependent vibration are illustrated in FIGS. 10a and 10b. Both principal modes of vibration involve a vertical movement having a maximum displacement Z and a rotation through an angle θ.

As indicated in FIG. 10a, one of these principal modes of vibration includes a rotation through an angle $\theta_1$ about an axis at a point Q displaced from the inertial member 50 on or near the spring end 53 and a vertical movement with a maximum displacement $Z_1$.

FIG. 10b shows a rotation $\theta_2$ about an axis through point N which is on the inertial member and displaced from the center of gravity towards the other end or mass end of the inertial member, and a vertical movement having a maximum displacement $Z_2$.

When the moments of stiffness of the springs with respect to the center of gravity of inertial member 50 are equal, the displacement of the point Q from the CG becomes infinite while the displacement of the point N from the center of gravity becomes zero. As a result, the mode of vibration corresponding to that in FIG. 10a becomes a purely vertical vibration and the mode of vibration illustrated in FIG. 10b becomes a purely rotational vibration. The two modes are then independent of one another. However, nominally, when the moment of stiffness of springs 11 and 12 are not equal, the displacement of each point of rotation from the center of gravity becomes finite and non-zero and both principal modes of vibration include the combination of a vertical displacement and rotation through an angle as mentioned above.

The frequency of vibration, or resonance frequency, of the damper is different for each of the two modes of vibration illustrated in FIG. 10. The absolute frequencies and relative frequencies of these two modes of vibration are important to the effectiveness of the damper in its function of attenuating the vibration of the suspended cable to which it is attached.

A stretched cable under a constant tension load of T pounds is shown in FIG. 9. When the wind blows, the natural characteristic of this cable is to vibrate in a vertical plane. The cable will then have a deflection curve with any one of a number of specific wave shapes, such as that shown in FIG. 9. Such a deflection curve is approximately sinusoidal. The cable vibrates up and down at a particular frequency and with a deflection amplitude A which depends primarily on the wind speed and the temperature of the cable and is exactly the same for each half cycle of vibration when a steady state condition is reached. At certain points G and H along the cable, the deflection of the cable is zero and the distance between these points is half the wavelength of the vibration. These points G and H are called nodal points, or nodes, and are points at which the cable is motionless so far as vertical displacement is concerned. The distances between nodal points is referred to as the loop length S. As shown in FIG. 9, the maximum amplitude of deflection occurs half-way between nodal points or near the center of each loop length.

It is well known in the art that the length of a loop is inversely proportional to the wind velocity for a given constant conductor tension, constant conductor weight per unit length, and constant conductor diameter. More specifically, the well known empirical relationship can be represented by the following equation:

$$S = 0.87 \times \frac{d}{V} \times \sqrt{\frac{T}{W}} \quad (1)$$

where
$d$ = the conductor diameter in inches
$V$ = the wind velocity in miles per hour
$T$ = the conductor tension in pounds
$W$ = the conductor weight per unit length in pounds per foot A very useful concept in the design of vibration dampers is that of mechanical impedance or dynamic mass. Dynamic mass of a cable span is defined as the force applied to the cable at any point in a vertical direction divided by the acceleration of the cable at the same point in the vertical direction. The dynamic mass varies along the length of the cable and, at each point, it is a function of frequency. As the dynamic mass increases, the force required to produce a given acceleration increases. Similarly, the greater the dynamic mass, the less the acceleration for a given force. Since the maximum amplitude of displacement occurs at points halfway along the loop length, acceleration is largest at points of maximum displacement amplitude. These are points at which the dynamic mass or mechanical impedance of the cable is a minimum. Conversely, at points on the cable near the nodal points, the acceleration is small and hence the dynamic mass of the cable at those points is relatively large.

It is also useful to distinguish between mechanical impedance as defined above, wherein the vertical displacement is measured at the point of the cable at which the force is applied and a mechanical impedance wherein the vertical acceleration of the cable is measured at a point other than the point at which the force is applied. The former mechanical impedance is called a driving point mechanical impedance while the latter is called a transfer mechanical impedance.

Measurements

Further shown in FIG. 9 are locations along or near the cable relevant to measurements of the effectiveness of a damper. Points 1, 2, 4, and 5 indicate various points on the suspended cable. Point 1 represents the point of application of an applied test force. Point 2 represents the point on the cable at which the damper is to be connected. Point 3 represents the equivalent point on the damper which is to be connected to the cable, the Points 4 and 5 represent points on the cable at which measurements of acceleration would be made. The vibration amplitude is measured with accelerometers while maintaining sinusoidal motion resulting from the applied test force. The vibration amplitude of the cable at Point 4 with the damper on the cable (Points 2 and 3 connected) divided by the amplitude of the cable at Point 4 without the damper on the cable (Points 2 and 3 disconnected) is called the reflection vibration. The residual vibration is the vibration amplitude of the cable at Point 5 with Points 2 and 3 connected, divided by the vibration amplitude of the cable at Point 5 with Points 2 and 3 disconnected. The vibration attenuation at Point 4, $V_4$, and the vibration attenuation at Point 5, $V_5$, expressed in percent, can be calculated from the measurements and are given by the following equations:

$$V_4 = \left(1 - \frac{a_4'}{a_4}\right) 100 \quad (2)$$

$$V_5 = \left(1 - \frac{a_5'}{a_5}\right) 100 \quad (3)$$

where $a_4'$ = The vibration amplitude at Point 4 with the damper on the cable.

$a_4$ = The vibration amplitude at Point 4 without the damper on the cable.

$a_5'$ = The vibration amplitude at Point 5 with the damper on the cable.

$a_5$ = The vibration amplitude at Point 5 without the damper on the cable.

All required data are taken at each frequency of interest while applying the identical value of test force with and without the damper on the cable. In effect, transfer impedances and transfer dynamic masses of the cable are being measured with and without the damper on the cable.

The procedure for making such measurements is described in U.S. Pat. No. 3,675,471 (Bouche, 1972).

Figure 11:
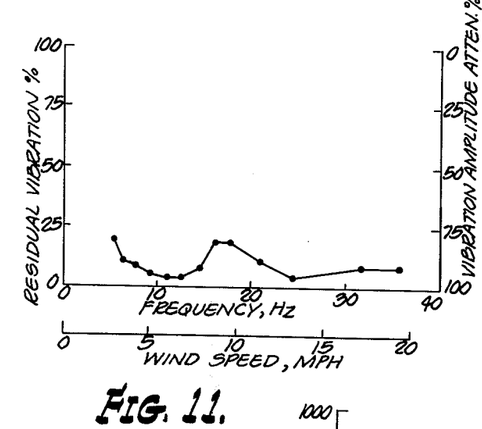
FIGS. 11 and 12 are graphs which indicate the effectiveness of one embodiment of this invention.

FIG. 11 is a graph of residual vibration attenuation versus frequency and wind speed for the point on the cable two feet from the near suspension point (Point 5 in FIG. 9).

Figure 12:
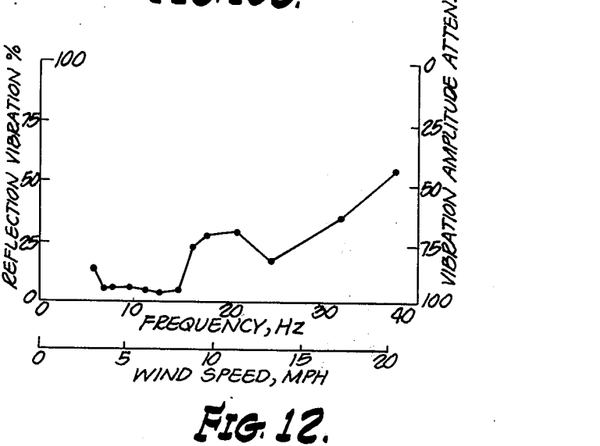

FIG. 12 is a graph of reflection vibration attenuation, measured at a point three feet from the far end of the cable (Point 4 in FIG. 9).

The cable and damper used for these measurements have the characteristics indicated in Table I.

TABLE I

| Cable Parameters | | Damper Parameters | |
|---|---|---|---|
| Diameter | 1.762" | Length of mass | 36" |
| Length | 145' | Weight | 36 lbs |
| Tension | 14,500 lbs | Spring Separation | 12" |
| Weight/Length | 2.5 lbs/ft | Location of spring end clamp | 5' from suspension point |

The point dynamic mass of the damper is obtained by attaching the damper to a vibration shaker and measuring the ratio of the force at Point 3 to the acceleration at Point 3 and the phase angle difference between the sinusoidal force and acceleration.

Figure 13:
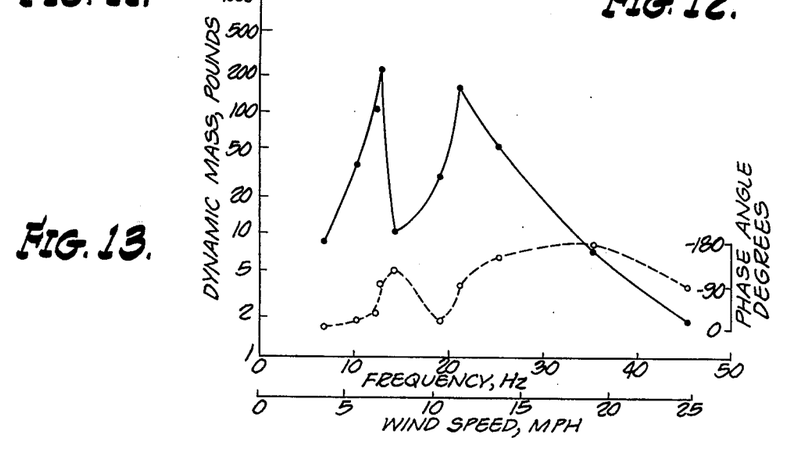
FIG. 13 is a graph which illustrates certain characteristics of this invention.

FIG. 13 represents the dynamic mass of the embodiment of this invention depicted in FIG. 2 and further having the specific physical properties of the damper unit II as indicated in Table II. Table II indicates the more pertinent parameters of two damper units that have been constructed and tested. Unit I is used on cables having a diameter of approximately 0.971 to 1.234 inches and Unit II is used on cables having a diameter of approximately 1.487 to 1.849 inches.

TABLE II

| Damper Unit | Damper Length | Damper Weight | Spring Separation | Spring Stiffness |
|---|---|---|---|---|
| I | 24" | 20 lbs | 8" | 500 lbs/in. |
| II | 36" | 36 lbs | 12" | 500 lbs/in. |

As can be observed from FIG. 13, this damper has two resonances located at frequencies corresponding to the lower wind speeds. The lower resonance frequency corresponds to wind speeds slightly above 5 miles per hour, and the higher resonance frequency corresponds to wind speeds slightly lower than 15 miles per hour. It will be recalled that the critical wind speeds for high voltage lines lie in the range extending from 5 mph to 15 mph.

The lower curve in FIG. 13 represents the phase characteristic of the dynamic impedance of the damper as a function of frequency. The effectiveness of the cable damping is further improved if this phase characteristic is generally smooth in its variations as a function of frequency throughout the range of critical wind speeds.

Many tests were conducted to determine a practical means for improving damper performance to the extent described herein. The results showed the desirability of providing an elongated inertial member and an increased separation between springs. Achievement of this increase in spring separation was clearly more economical when the springs were attached to separate points on the cable. However, this separation of attachment points provided the additional advantage of an increase in rotational coupling between the cable and the damper. This increase in coupling is caused by the exertion of separate and distinct forces by the vibrating cable on the damper at the widely separated points of attachment.

Additional improvements in damper effectiveness were achieved during testing. Vibrations having frequencies in the critical wind speed range are further attenuated by the inclusion of tubular members composed of rubber-like material compressed within the helical springs 10 and 11. These tubular members smooth out the phase characteristics of the damper, resulting in a more favorable mechanical impedance curve.

It has also been found advantageous to attach the damper to the suspended cable with the spring end 53 of the damper pointed towards the near point of suspension. This orientation of the damper with respect to the cable maximizes the torque moment along the longitudinal axis X—X of the inertial member. This results in a further increase in dynamic mass and a concomitant improvement in damper effectiveness.

The damper is mounted at a position on the cable at which the cable would normally vibrate a substantial amount in a vertical direction as well as angularly about a horizontal axis. Such a mounting position is effective if it is located between about 10% and 20% of the loop length of the cable corresponding to a minimum average critical wind speed. In the case of high tension cables having parameters as set forth in Table II, the damper there described is located 5 feet from the suspension at one end of the span. When so mounted, the damper produces adequate damping as illustrated in FIGS. 11 and 12 at both ends of the span as well as at intermediate points. In connection with installing a damper at a position related to such a typical loop length, it is to be borne in mind that the length of such a span would normally be many times the length of such loop. Thus, for such a high tension cable, a typical span length would be 1,000 feet, and the length of a loop for a wind speed of about 5 mph would be about 23 feet.

In the case of such a high voltage cable, the damper may be mounted directly on the cable 60, while for a lower voltage cable having a smaller diameter and other characteristics that cause the typical loop length in the critical wind speed range to be less, the damper would often be mounted directly on the armor rod 61 as indicated in FIGS. 1 and 2.

If the vibration attenuation is approximately 75% over a predominant portion of the range of critical wind speeds, the damper is acceptably effective. Effectiveness of damping is increased if the two resonance frequencies of the damper occur near the range of critical wind speeds of 5 miles per hour to 15 miles per hour. It is well known in the art that these lower wind speeds are the most critical because they place the highest dynamic stresses on the ends of the cable at the points of attachment. However, the vibration attenuation above 75% will increase by at least several orders of magnitude the number of vibration cycles prior to failure of the cable. Moreover, conductor fatigue failures and damage to suspension hardware are minimized to the extent of being virtually eliminated.

An indication of the effectiveness of dampers is the extent to which one damper will provide vibration attenuation at points along the span far from the damper including points near the opposite end of the cable.

When the vibration attenuation provided by a single damper is 75% or higher along the entire length of the cable during occurrence of the critical lower wind speeds, the desirable advantage of having to attach just one damper to a full span of suspended cable is achieved.

The attenuation curve of FIG. 12 indicates the presence of this advantage in the specimen tested.

Second Embodiment

Figures 6, 7, 8, 14:
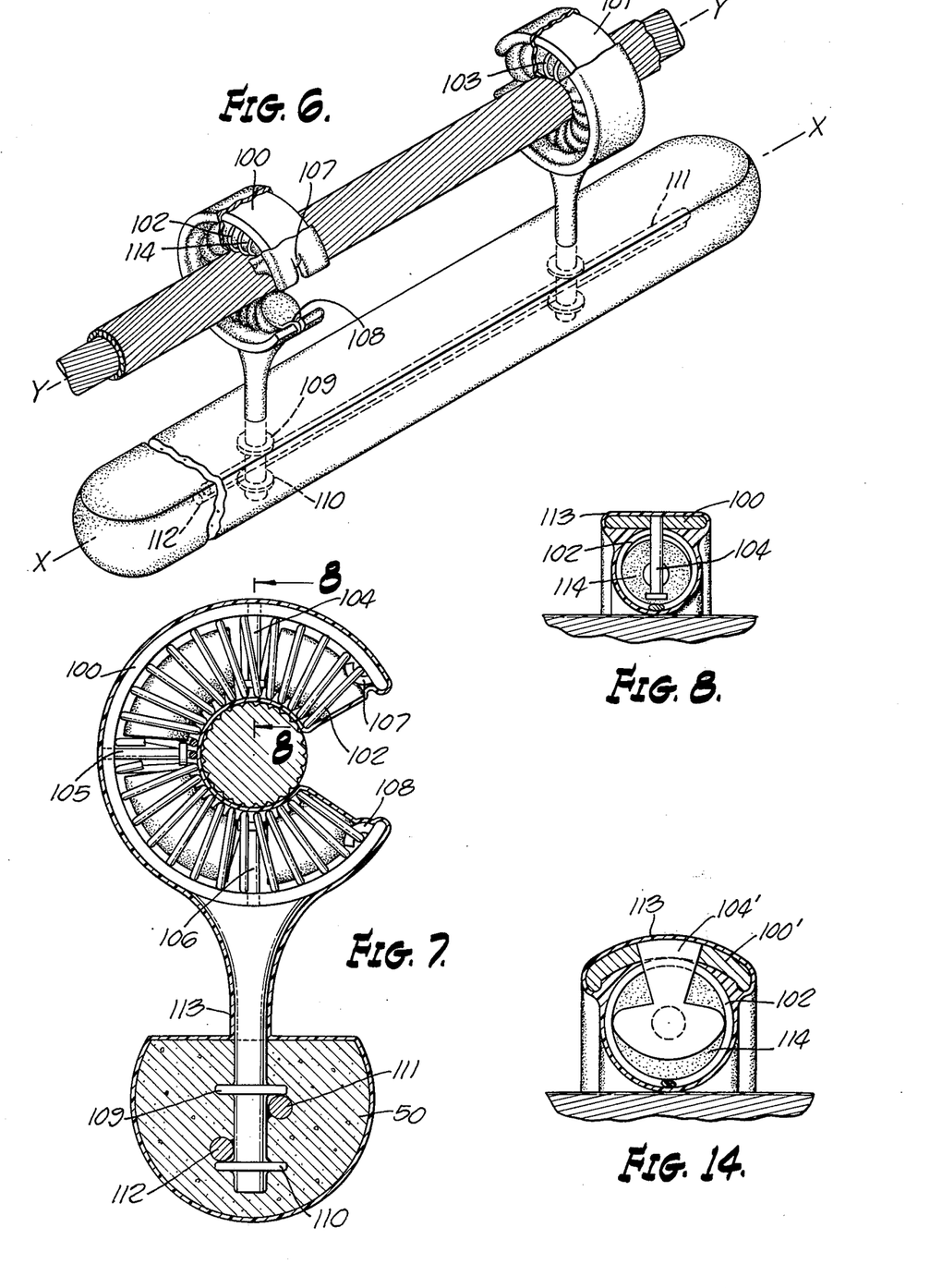
FIG. 6 is a perspective view of an alternate embodiment of this invention.
FIG. 7 is a cross-sectional view of the embodiment shown in FIG. 6.
FIG. 8 is a cross-sectional view of a portion of the alternate embodiment shown in FIG. 7 taken along the line 8—8.
FIG. 14 is an alternate configuration of the view shown in FIG. 8.

An alternate embodiment of this invention having a different arrangement of the resilient support members, that is a different arrangement of the springs and clamps, is illustrated in FIGS. 6 and 7. Couplings 100 and 101 each have a helically wound toroidal spring 102 and 103 respectively, arcuately nested along the inside surface of the C-shaped ends. Springs 102 and 103 are secured to the respective couplings by T-shaped studs 104, 105, and 106, and by end flanges 107 and 108 of the coupling as shown best in FIG. 7.

Each coupling has an elongated end or stem portion which is embedded in the free vibratory inertial member 50.

Foot members 109 and 110 serve both as guideways for supporting rods 111 and 112 and to increase the retentional friction of coupling 100 to the inertial member 50.

Cable 60 lies along the common toroidal axis, or axis of revolution Y—Y of the toroid shapes formed by springs 102 and 103, thus being resiliently but securely connected to the damper. Each coupling has a lateral opening through which the cable 60 is forced and snapped snugly into place in sufficient compression of the spring to prevent slipping. T-shaped studs 104, 105, and 106 serve the additional purpose of limiting the travel of cable 60 relative to coupling 100 whenever the relative motion exceeds the available spring compression. A rubber-like material, such as Dow Corning silicone rubber Type 1890 permeates the springs 102 and 103 and serves as a coating 113 surrounding the C-shaped end, spring and T-shaped studs. The coating is best illustrated in FIG. 8.

A rubber-like material tubular member 114 lies inside the springs 102 and 103 as shown in FIGS. 7 and 8. This member serves the same purpose as the tubular member of the embodiment shown in FIG. 1. The coating 113 and tubular member 114 add resilience to the spring and protect the coupling and spring from weather corrosion.

The respective elongated ends and C-shaped ends are positioned to be parallel, the points of intersection of the couplings and the inertial member lying along a common line parallel to the longitudinal axis X—X of the inertial member 50. The lateral openings of the C-shaped ends are oppositely directed, thus facing opposed edges of the inertial member. This configuration permits easier installation by connecting the damper with a simple rotating motion about a vertical axis.

A differently shaped coupling 100′ and retaining stud 104′ are shown in FIG. 14. This configuration of coupling and stud would permit better accommodation and retention of the spring 102.

Third Embodiment

Figure 15:
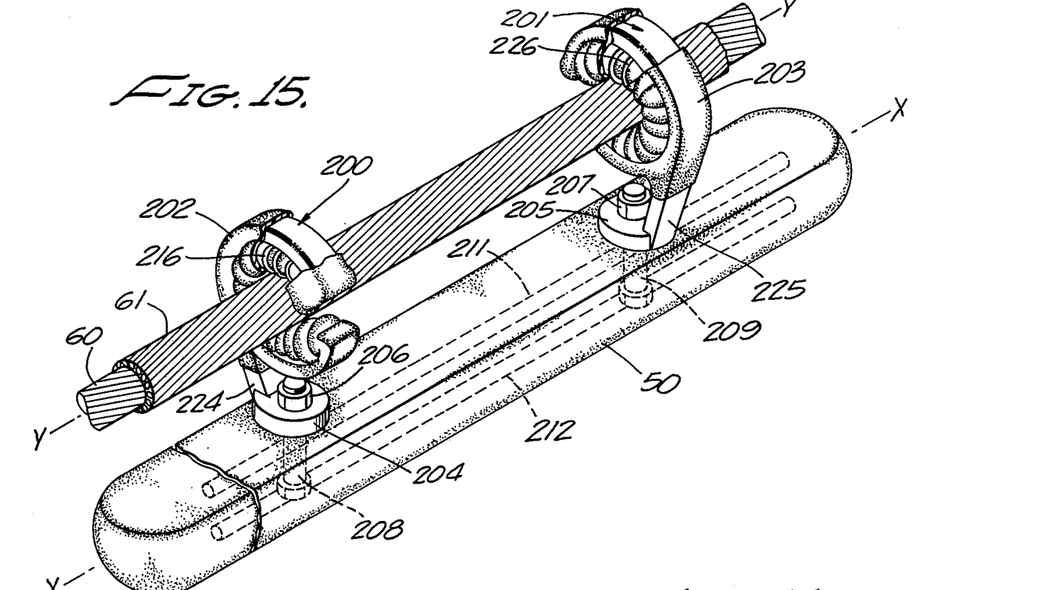
FIG. 15 is a perspective view of an additional alternate embodiment of this invention.
Figure 16:
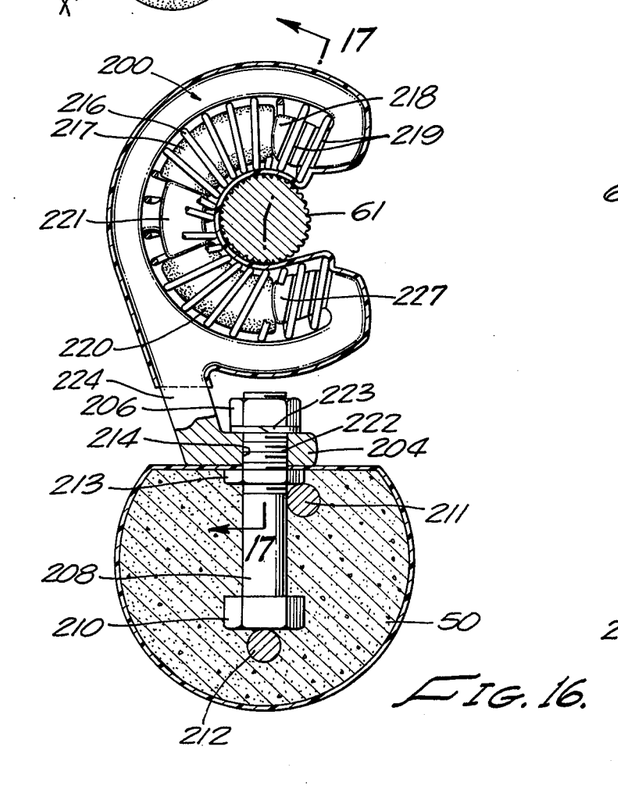
FIG. 16 is a cross-sectional view of the embodiment shown in FIG. 15.
Figure 17:
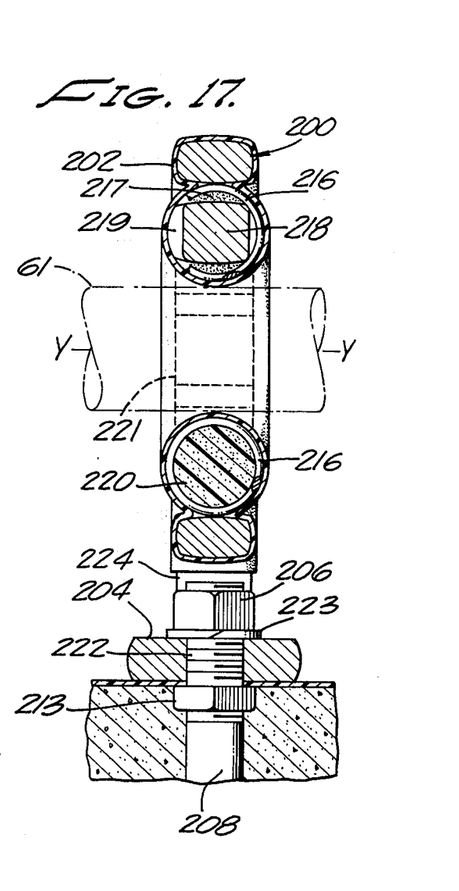
FIG. 17 is an enlarged cross-sectional view taken along the lines 17—17 of FIG. 16.

An additional alternate embodiment of this invention, having resilient support members similar in appearance to those of the second embodiment, but having differently structured couplings 200 and 201, is illustrated in FIGS. 15, 16, and 17. Unlike the couplings 100 and 101 of the embodiment of the invention illustrated in FIGS. 6 and 7, the couplings 200 and 201 are removably attached to the freely suspended inertial member 50.

To provide this removable feature, each of the couplings 200 and 201 has a C-shaped end 202 and 203 respectively, and a foot member 204 and 205 respectively, each of which is flattened to provide a suitable surface for securing couplings 200 and 201 to the flat top-surface of the inertial member 50. The foot members 204 and 205 are connected to the respective C-shaped ends 202 and 203 by means of leg members 224 and 225 respectively. Each leg member extends tangentially from a location adjacent the midpoint of the C-shaped end. The respective leg and foot members of each coupling are together referred to herein as the respective stem portions of the couplings.

The couplings 200 and 201 are secured by means of hexagonal nuts 206 and 207 to vertical mounting studs 208 and 209 respectively, each of which forms part of the inertial member.

As seen best in FIGS. 16 and 17, the vertical stud 208 is partially embedded in the concrete inertial member 50 with a threaded portion 222 extending through the top surface of the inertial member. The stud head 210 rests against a lower reinforcing rod 212. A jam-nut 213, which lies just below the upper surface of the inertial member 50, rests against an upper reinforcing rod 211.

The vertical stud 208 extends through an aperture or bore hole 214 in foot member 204. The foot member is secured to the vertical stud by means of a lock-washer 223 and hexagonal nut 206.

It will be observed that the cable 60 lies along the common toroidal axis or axis of revolution Y—Y of the toroid shapes formed by the springs 216 and 226, as in the second embodiment of the invention previously described.

In the third embodiment of the invention, each coupling utilizes a single toroidal spring. For example, coupling 200 employs the spring 216 which is secured to the flanged opposing ends 218 and 227 respectively of the C-shaped portion of the coupling by means of a series of parallel grooves such as 219. The spring 216 is further secured by T-shaped retention stud 221 which retains the spring against the inside surface of the C-shaped ends of the coupling. The toroidal spring 216 is filled with two cylindrical pieces of closed-cell neoprene cord 217 and 220, each shaped to be compressed within and to conform to the inside surface of the spring.

Although not shown in the drawings, a neoprene adhesive may be applied to the inside surface of the C-shaped portion of the coupling to provide additional means for securing the pieces of neoprene cord and the toroidal spring within the coupling.

FIG. 17 illustrates in an enlarged scale, the relationship between the coupling 200, and the vertical stud 208; and shows an additional view of the relationship between the cable, shown in phantom lines, and the spring 216 within the coupling 200.

As in the embodiment previously described, rubber-like material, such as Dow Corning silicone rubber type 1890 permeates springs 216 and 226 and serves as a coating surrounding the C-shaped ends, springs, T-shaped retention studs, and end flanges. The foot members 204 and 205 need not be coated.

Thus it can be seen that the third embodiment of the invention provides coupling means which may be separately transported to the final assembly or installation site and removably attached to the inertial member prior to installation of the damper onto the cable. This removable attachment feature provides a number of advantages not available in either of the first two embodiments of the invention. By way of example, the coupling members may be separately transported to the final assembly or installation site in a more convenient package and from different manufacturing locations.

This permits the independent fabrication of the inertial member including the pouring of concrete at a final assembly location close to the installation site where the concrete may be purchased less expensively and transported at a lower cost.

The third embodiment of the invention herein described provides an additional advantage regarding maintenance and repair of dampers by making it feasible to replace one or both clamps or the inertial member, any of which may have been damaged, without having to replace all three of these elements of the damper.

From the foregoing explanation, it may readily be seen that this invention, though providing a simple and inexpensive damper, also provides a significant improvement over prior art dampers by serving to attenuate Aeolian vibrations over the entire length of a span of suspended cable throughout the range of high stress inducing wind speeds even though a damper is installed at only one end of the span. This invention provides an even greater improvement in damping when two such dampers are employed on each cable span.

It will be apparent from the foregoing that the invention is not limited to the specific embodiments described, but that many changes may be made in the design or materials of which the various parts of this invention are comprised without departing from the scope of the invention as defined in the accompanying claims.

The invention claimed is:

1. In a system for damping Aeolian vibrations in a cable suspended between two points wherein damping is attained by means of a damper connected to said cable at a position near one point of suspension and remote from the other point of suspension, the improvement wherein said damper comprises:
an inertial member, and two resilient support members connected to asymmetrically located points on said inertial member and connecting said inertial member to separate points of said cable.

2. In a system for damping Aeolian vibrations in a suspended cable as defined in claim 1, wherein said resilient support members are spaced apart from each other a distance greater than the distance between said inertial member and said cable.

3. In a system for damping Aeolian vibrations in a cable suspended between two points as defined in claim 1, wherein each said resilient support member has a clamp rigidly connecting said damper to said cable, and also has a resilient member having a first end connected to said inertial member and a second end connected to said clamp.

4. In a system for damping Aeolian vibrations in a suspended cable as defined in claim 1, wherein said inertial member is elongated and has a spring end and a mass end, and is positioned to have said spring end directed toward said near point of suspension.

5. In a system for damping Aeolian vibrations in a suspended cable as defined in claim 1 in which said damper has two interdependent modes of vibration in a vertical plane that extends through said cable.

6. In a system for damping Aeolian vibrations in a cable suspended between two points wherein damping is attained by means of a damper connected to said cable at a position near one point of suspension and remote from the other point of suspension, the improvement wherein said damper comprises:
an inertial member, and two resilient support members separately connecting said inertial member to separate points of said cable,
each said resilient support member having a clamp rigidly connected said damper to said cable, and also having a resilient member having a first end connected to said inertial member and a second end connected to said clamp, and
two rubber-like material tubular members, each such tubular member being compressively nested inside the respective resilient members.

7. In a system for damping Aeolian vibrations in a cable suspended between two points wherein damping is attained by means of a damper connected to said cable at a position near one point of suspension and remote from the other point of suspension, the improvement wherein said damper comprises:
an inertial member, and two resilient support members separately connecting said inertial member to separate points of said cable, and each said resilient support member comprising a coupling having a C-shaped structure at one end and having an elongated structure at a second end formed integrally with said C-shaped structure, and
a toroidal spring arcuately nested along the inner surface of said C-shaped structure for gripping said suspended cable,
each said coupling being positioned to have the axis of revolution of said spring about parallel to said cable.

8. In a system for damping Aeolian vibrations in a suspended cable as defined in claim 7 wherein said toroidal springs of said resilient support members have a common axis of revolution and are oppositely directed relative to the length of said cable.

9. In a system for damping Aeolian vibrations in a suspended cable as defined in claim 7, wherein each said resilient support member further comprises:
a tubular member composed of rubber-like material and compressively nested inside said toroidal spring.

10. In a system for damping Aeolian vibrations in a suspended cable as defined in claim 7, said C-shaped structure further comprising a plurality of T-shaped retention studs, each such stud being positioned along said inner surface.

11. In a system for damping Aeolian vibrations in a suspended cable as defined in claim 10, wherein said toroidal spring and said C-shaped structure, including said T-shaped retention studs, are coated with a non-corrosive material 12. In a device for damping Aeolian vibrations of a suspended cable:
 a free vibratory inertial member,
 two and only two separate spaced-apart clamp members adapted to asymmetrically connect said inertial member to separate points on said cable, each said respective clamp member being shaped to partially embrace said suspended cable at a plurality of points distributed over more than half the perimeter of said cable including its top and bottom and at least one side thereof, and
 two resilient members connecting the respective clamp members to said inertial member between the ends thereof.

13. In a device for damping Aeolian vibrations as defined in claim 12, wherein said inertial member comprises a spring end and a mass end, said resilient members being positioned asymmetrically toward said spring end and away from said mass end.

14. In a device for damping Aeolian vibrations of a suspended cable:
 an inertial member,
 two separate spaced-apart clamp members for asymmetrically connecting said inertial member to separate points on said cable,
 two resilient members connecting the respective clamp members to said inertial member respectively, each of said resilient members having an interior portion, and further comprising two tubular members composed of rubberlike material, each such tubular member being compressively nested within the interior portion of the respective resilient members.

15. In a system for damping Aeolian vibrations in a cable suspended between two points, wherein damping is attained by means of a damper connected to said cable at a position near one point of suspension and remote from the other point of suspension, the improvement wherein said damper comprises:
 an elongated inertial member having a spring end and a mass end, and
 two resilient support members being separately connected to said inertial member at asymmetrical positions on said inertial member,
 said resilient support members being spaced apart from each other and separately connecting said inertial member to separate points of such cable,
 the points of connection of said resilient support members to said inertial member and the stiffness of said resilient support members being such that the product of the coefficient of stiffness of each resilient support member and the distance of such resilient support member from the center of gravity of said inertial member is different from the product of the coefficient of stiffness of the other resilient support member and the distance of such resilient support member from the center of gravity of said inertial member, whereby said damper possesses two different but interdependent modes of vibration at two different frequencies about two different horizontal axes perpendicular to a vertical plane that extends through said cable and through said two resilient members,
 said damper being positioned to have said spring end of said inertial member directed toward said near point of suspension.

16. In a device for damping Aeolian vibrations of a suspended cable, the improvement comprising:
 a damper having a free vibratory inertial member and having two and only two resilient support members external to said inertial member, said resilient support members having lower ends connected to points of said inertial member between the ends thereof, said resilient support members comprising separate means at the ends thereof remote from said inertial member for separate connection of said resilient support members to separate points of such suspended cable by externally gripping said cable at points distributed over more than half the perimeter of said cable and without forming a passage through said cable, whereby said damper may hang from said cable when connected thereto by said resilient support members with said inertial member at the lower end thereof.

17. A device for damping Aeolian vibrations as defined in claim 16 wherein each said resilient support member comprises a helical spring, having a longitudinal axis that is transverse to the longitudinal axis of said inertial member.

18. In a device for damping Aeolian vibrations as defined in claim 16, wherein said inertial member is shaped to have only rounded edges on all surfaces located to be contrapositioned to said cable.

19. In a device for damping Aeolian vibrations as defined in claim 16, the improvement wherein the points of connection of said resilient support members to said inertial member and the stiffness of said resilient support members are such that the product of the coefficient of stiffness of each resilient support member and the distance of such resilient support member from the center of gravity of said inertial member is different from the product of the coefficient of stiffness of the other resilient support member and the distance of such resilient support member from the center of gravity of said inertial member, whereby said damper possesses two different but interdependent modes of vibration at two different frequencies about two different horizontal axes perpendicular to a vertical plane that extends through the longitudinal axis of said inertial member.

20. In a device for damping Aeolian vibrations as defined in claim 16, wherein said resilient support members are spaced apart a distance greater than the length of any said resilient support members.

21. In a device for damping Aeolian vibrations as defined in claim 19, wherein separate means comprises:
 a clamp member for rigid attachment to said cable,
 each said resilient support member including a helical spring having one end connected to the clamp member, and having a second end connected to said inertial member.

22. In a device for damping Aeolian vibrations as defined in claim 21, wherein each said resilient support member further comprises:
 a tubular member composed of rubber-like material and compressively nested inside said helical spring.

23. In a device for damping Aeolian vibrations of a suspended cable, the improvement comprising:

a damper having a free vibratory inertial member and having two resilient support members external to said inertial member, said resilient support members having lower ends connected to points of said inertial member between the ends thereof, said resilient support members comprising separate means at the ends thereof remote from said inertial member for separate connection of said resilient support members to separate points of such suspended cable by externally gripping said cable at such points and without forming a passage through said cable, whereby said damper may hang from said cable when connected thereto by said resilient support members with said inertial member at the lower end thereof;

said separate means comprising separate clamp members, each such clamp member comprising:

a coupling having a C-shaped structure at one end and having an elongated structure at a second end formed integrally with said C-shaped structure, and a toroidal spring arcuately nested along the inner surface of said C-shaped structure for gripping said cable, said coupling being positioned to have the toroidal axis of said spring about parallel to the longitudinal axis of said inertial member.

24. In a device for damping Aeolian vibrations as defined in claim 23, wherein each said resilient support member further comprises:

a tubular member composed of rubber-like material and compressively nested inside said toroidal spring.

25. In a device for damping Aeolian vibrations as defined in claim 23, wherein said springs have a common axis of revolution and wherein said couplings are oppositely directed relative to the longitudinal axis of said inertial member.

26. In a device for damping Aeolian vibrations as defined in claim 23, wherein each said C-shaped structure comprises a plurality of T-shaped retention studs, each such stud being positioned on said inner surface to mechanically retain said toroidal spring and to provide displacement limits for said cable relative to said device.

27. In a device for damping Aeolian vibrations as defined in claim 26, wherein said toroidal spring and said C-shaped structure, including said T-shaped retention studs, are coated with a non-corrosive material.

28. In a system for damping Aeolian vibrations of a cable suspended between two points, the combination with said cable of a free vibratory inertial member in a position beneath said cable, first and second resilient members external to said inertial member, each being separately attached to a separate point of said inertial member between the ends thereof and to said cable, the point of connection of said first resilient member to said cable being spaced from the point of connection of said second resilient member to said cable.

29. In a device for damping Aeolian vibrations in a suspended cable, the improvement comprising:

an elongated inertial member, two resilient support members being separately connected to said inertial member at asymmetrical positions on said inertial member, said resilient support members being spaced apart from each other for separately connecting said inertial member to separate points of such cable and each said resilient support member being adapted for gripping said cable at a plurality of points distributed over more than half the perimeter of said cable, the points of connection of said resilient support members to said inertial member and the stiffness of said resilient support members being such that the product of the coefficient of stiffness of each resilient support member and the distance of such resilient support member from the center of gravity of said inertial member is different from the product of the coefficient of stiffness of the other resilient support member and the distance of such resilient support member from the center of gravity of said inertial member, whereby said damper possesses two different but interdependent modes of vibration at two different frequencies about two different horizontal axes perpendicular to a vertical plane that extends through the longitudinal axis of said inertial member.

30. A resilient support member adapted for connecting an inertial member to a cable suspended between two points to form a damper for dampening Aeolian vibrations of the cable, the resilient support member comprising:

a clamp portion adapted to partially surround said suspended cable about its top, bottom, and at least one side thereof, a resilient portion having at least one tubular spring member adapted for connection at a first end to said clamp portion and connected at a second end to said inertial member, and a rubber-like tubular member compressively nested inside said tubular spring member.

31. A resilient support member adapted for interconnecting a cable suspended between two points and an inertial member to form a damper for dampening Aeolian vibrations of the cable, the resilient support member comprising:

a C-shaped clamp portion having a toroidally shaped spring that is arcuately nested along the inside surface of said clamp portion, said spring being secured therein by a T-shaped retention stud extending inwardly from said inside surface at a location at about the midpoint of said C-shaped clamp portion and by two reversely folded flanges extending from the respective end points of said C-shaped clamp in a direction about parallel to said C-shaped clamp, the opposed ends of said spring each partially surrounding one of said folded flanges; and a stem portion formed integrally with said C-shaped clamp portion and having a leg member extending tangentially from said C-shaped clamp portion and having a foot member attached to an extending substantially transverse to said leg member.

32. A resilient support member as defined in claim 31 wherein said leg member extends tangentially from said C-shaped clamp portion at a location adjacent said midpoint.

33. A resilient support member as defined in claim 31 wherein said foot member is attached to the terminus of said leg member.

34. A resilient support member as defined in claim 31, said foot member having a bore hole for removably connecting said resilient support member to said inertial member.

35. A resilient support member adapted for interconnecting a cable suspended between two points and an inertial member to form a damper for dampening Aeolian vibrations of the cable, the resilient support member comprising:
- a C-shaped structure at a first end and a stem portion at a second end formed rigidly with said C-shaped structure, and
- a toroidal spring arcuately nested along the inner surface of said C-shaped structure for gripping said suspended cable;
- said C-shaped structure having a hook portion for pressing downwardly on the upper surface of said cable;
- said stem portion being adapted for attachment to said inertial member whereby said inertial member may hang freely from said cable when connected thereto by said resilient support member, said stem portion having a leg member extending transversely relative to said hook portion to support said inertial member whereby said inertial member presses said hook portion against said cable when said damper is connected to said cable.

36. A resilient support member as defined in claim 35, wherein said stem portion is adapted for removable attachment to said inertial member.

37. A resilient support member as defined in claim 35, said C-shaped structure further comprising at least one T-shaped spring-retention stud that is positioned along said inner surface.

38. A resilient support member as defined in claim 35, said C-shaped structure comprising a pair of spring-retention flanges, said flanges being respectively positioned at the opposed ends of said C-shaped structure.

39. A resilient support member as defined in claim 35, said C-shaped structure and said toroidal spring each being coated with a non-corrosive resilient material.

40. A resilient support member as defined in claim 35, further comprising a rubber-like tubular member compressively nested inside said toroidal spring, the longitudinal axis of said tubular member being substantially parallel to the longitudinal axis of said spring.

41. A resilient support member adapted for connecting an inertial member to a cable suspended between two points to form a damper for dampening Aeolian vibrations of the cable, the resilient support member comprising:
- a C-shaped clamp having a hook portion adapted to partially surround said suspended cable about its top, bottom, and at least one side thereof and adapted to press downwardly on the upper surface of said cable,
- a resilient support portion having at least one toroidal spring member arcuately nested along the inside surface of said C-shaped clamp, and
- a leg member rigidly connected to said C-shaped clamp and extending transversely relative to said C-shaped clamp to support said inertial member.

* * * * *